United States Patent
Nagata et al.

(10) Patent No.: US 12,277,254 B2
(45) Date of Patent: Apr. 15, 2025

(54) HARDWARE TROJAN DETECTION METHOD, HARDWARE TROJAN DETECTION DEVICE, AND PROGRAM FOR HARDWARE TROJAN DETECTION

(71) Applicants: TOSHIBA INFORMATION SYSTEMS (JAPAN) CORPORATION, Kawasaki (JP); Waseda University, Tokyo (JP)

(72) Inventors: Shinichi Nagata, Kawasaki (JP); Koji Takahashi, Kawasaki (JP); Nozomu Togawa, Tokyo (JP); Masaru Oya, Tokyo (JP)

(73) Assignees: Toshiba Information Systems (JAPAN) Corporation, Kawasaki (JP); Waseda University, Tokyo (JP)

( * ) Notice: Subject to any disclaimer, the term of this patent is extended or adjusted under 35 U.S.C. 154(b) by 358 days.

(21) Appl. No.: 18/003,275

(22) PCT Filed: Jun. 23, 2021

(86) PCT No.: PCT/JP2021/023846
§ 371 (c)(1),
(2) Date: Dec. 23, 2022

(87) PCT Pub. No.: WO2021/261532
PCT Pub. Date: Dec. 30, 2021

(65) Prior Publication Data
US 2023/0252192 A1    Aug. 10, 2023

(30) Foreign Application Priority Data
Jun. 25, 2020    (JP) .................................. 2020-110020

(51) Int. Cl.
G06F 21/00    (2013.01)
G06F 21/71    (2013.01)
G06F 30/327   (2020.01)

(52) U.S. Cl.
CPC ............ *G06F 21/71* (2013.01); *G06F 30/327* (2020.01)

(58) Field of Classification Search
CPC .. G06F 21/71; G06F 30/327; G06F 2221/034; G06F 21/56; G06F 21/76; G06F 30/398
See application file for complete search history.

(56) References Cited

U.S. PATENT DOCUMENTS 11,663,382 B1 * 5/2023 Cascioli ................. G06F 30/33
                                                        703/15
2016/0349314 A1* 12/2016 Dubrova ........ G01R 31/318385
(Continued)

FOREIGN PATENT DOCUMENTS

CN      104950246 A       9/2015
JP      2001-350815 A    12/2001
(Continued)

OTHER PUBLICATIONS

Sophie Dupuis, et al., "Protection Against Hardware Trojans With Logic Testing: Proposed Solutions and Challenges Ahead," IEEE Design & Test, vol. 35, No. 2, pp. 73-90 (Mar./Apr. 2018).
(Continued)

Primary Examiner — William A Corum, Jr.
(74) Attorney, Agent, or Firm — Finnegan, Henderson, Farabow, Garrett & Dunner, LLP

(57) ABSTRACT

A hardware trojan detection method is provided including an input and output updating step of updating input and output values of all logic cells by performing computations according to logical expressions of all logic cells included in a netlist to be verified and a detection step of performing
(Continued)

hardware trojan detection based on a comparison result of the updated input and output values and a threshold.

18 Claims, 17 Drawing Sheets

(56) References Cited

U.S. PATENT DOCUMENTS

| | | | |
|---|---|---|---|
| 2018/0032760 A1* | 2/2018 | Hu | G06F 21/71 |
| 2020/0226492 A1* | 7/2020 | Madani | G06N 3/08 |
| 2020/0394340 A1* | 12/2020 | Wu | G06F 21/568 |
| 2021/0003630 A1* | 1/2021 | Mishra | G06F 21/71 |
| 2022/0188415 A1* | 6/2022 | Mishra | G06F 21/556 |

FOREIGN PATENT DOCUMENTS

| | | |
|---|---|---|
| JP | 2005-141538 A | 6/2005 |
| JP | 6566576 B2 | 8/2019 |
| WO | WO 2016/080380 A1 | 5/2016 |

OTHER PUBLICATIONS

Japan Patent Office, "Notice of Reasons for Refusal" in JP App. No. 2020-110020, 5 pages, and machine translation, 6 pages (Jun. 6, 2023).

* cited by examiner

| LSLG type | Pout(H) |
|---|---|
| AND | $\prod P_i(H)$ (= P1(H) * P2(H) * ... * Pn(H)) |
| NAND | $1-\prod P_i(H)$ |
| OR | $\sum (P_{n-1} + (1 - P_{n-1})P_n)$ |
| NOR | $1-\sum (P_{n-1} + (1 - P_{n-1})P_n)$ |
| INV | $1 - P_i(H)$ |
| BUF | $P_i(H)$ |
| MUX | Calculated so that probability is more biased |
| DFF | Pout(H) = Pdata(H)<br>*Propagates register of counter unit |

FIG. 8

HARDWARE TROJAN DETECTION METHOD, HARDWARE TROJAN DETECTION DEVICE, AND PROGRAM FOR HARDWARE TROJAN DETECTION

CROSS-REFERENCE TO RELATED APPLICATIONS

This Application is a National Phase of International Application No. PCT/JP2021/023846, filed Jun. 23, 2021, which claims priority to Japanese Application No. JP 2020-110020, filed Jun. 25, 2020, both of which are incorporated herein by reference in their entireties.

FIELD OF ART

This invention relates to a hardware trojan detection method, a hardware trojan detection device, and a hardware trojan detection program.

BACKGROUND

Hardware trojans have as their main components a trigger circuit, which controls startup so the hardware trojan operates under a certain condition, and a payload circuit, which outputs fraudulent data when the hardware trojan is started up by this trigger circuit. Hardware trojans are generally configured to function very rarely in order to make them difficult to be found by logic simulation.

When running a hardware trojan by logic simulation, simulation by test patterns is the norm. As above, because hardware trojans function very rarely, states must be observed using all test patterns, and simulation takes a large amount of time. Moreover, when performing transition probability simulation, information of all cells being used (in a library or the like) is necessary. Accordingly, it is difficult for those other than the designer to perform hardware trojan detection.

Japanese Application No. JP 2001-350815 A discloses a system that performs operation rate calculation by an RTL simulation means, a gate operation rate calculation pattern creation means, and a netlist simulation means. According to this system, gate operation rate calculation pattern creation realizes a very large reduction in the number of patterns compared to the original patterns, and netlist simulation enables execution in a very small amount of time compared to simulation using the original test patterns.

However, the system of JP 2001-350815 A is still a simulation, and gate operation rate calculation pattern creation has its limits despite its very large reduction in the number of patterns compared to the original patterns.

Furthermore, Japanese Application No. JP 2005-141538 A discloses an operation rate calculation method that uses a netlist of a target electronic circuit, an operation rate imparted to an input terminal of each macrocell, a probability of the input terminal being high-level, and a truth table database of the macrocells. In the disclosed method, an operation rate of an output terminal of each macrocell and a probability of the output terminal being high-level are found based on the above operation rate, the probability of the input terminal being high-level, and the truth tables; this is propagated from an input stage to a final stage to find the operation rates of the macrocells in the netlist.

The above art disclosed in JP 2005-141538 can find macrocell operation rates, which leads to, for example, reduced risk due to heat generation. However, hardware trojan detection is not called to mind.

Furthermore, Japanese Patent No. JP 6566576 B2 discloses imparting a score to a constituent net in a known netlist that may include a trojan net, this constituent net serving as a control net; searching for the above control net in a netlist to be verified and imparting the above score thereto; and using this score to perform hardware trojan detection.

SUMMARY

Problem to Be Solved

An embodiment of the present invention provides a hardware trojan detection method that can appropriately detect a hardware trojan in a relatively short amount of time when, for example, a hardware trojan is interpolated in a situation wherein, for example, IP (intellectual property) is being used in SoC (system on a chip) design.

Means for Solving the Problem

A hardware trojan detection method of the present disclosure is provided with an input and output updating step of updating input and output values of all logic cells by performing computations according to logical expressions of all logic cells included in a netlist to be verified and a detection step of performing hardware trojan detection based on a result of a comparison between the updated input and output values and a threshold. Note that a logical computation performed in a logic cell is generally computation of a logical value having only two types of values, such as 1 and 0 or true and false. In contrast, in the present disclosure, computation according to logical expressions of logic cells is performed using numerical values other than the above logical value having only two types of values (decimals such as 0.5 and 0.25, integers such as 5 and 10, and other numbers).

BRIEF DESCRIPTION OF DRAWINGS

FIG. 8 is a diagram illustrating the calculations in a situation of updating by the computations according to the logical expressions for the logic cells.

EMBODIMENTS OF THE INVENTION

Hardware trojan detection methods, hardware trojan detection devices, and hardware trojan detection programs embodying the present invention are described below with reference to the included drawings. In the diagrams, identical components are labeled with the same reference sign, and redundant description is omitted.

Figure 1:
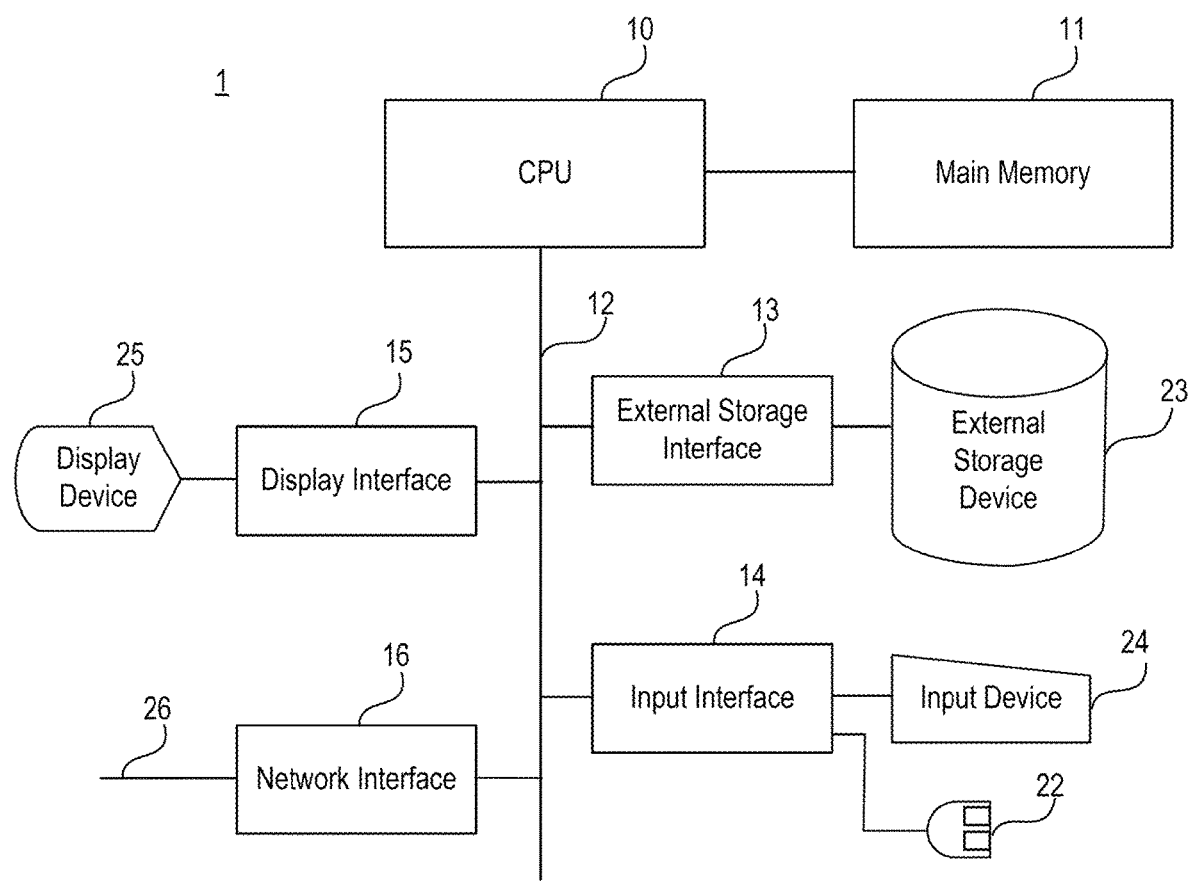
FIG. 1 is a configuration diagram of a computer system that realizes a hardware trojan detection device of a first embodiment of the present invention.

A hardware trojan detection device 1 of a first embodiment of the present invention can be configured by a personal computer, a workstation, or another computer system such as that illustrated in FIG. 1. This computer system operates as the hardware trojan detection device 1 by a CPU 10 controlling each unit based on a program or data stored in or read into a main memory 11 and executing necessary processing.

An external storage interface 13, an input interface 14, a display interface 15, and a network interface 16 are connected to the CPU 10 via a bus 12. An external storage device 23 storing a program (such as a hardware trojan detection program), necessary data, and the like is connected to the external storage interface 13. An input device 24, such as a keyboard, as an input device for inputting commands and data and a mouse 22 as a pointing device are connected to the input interface 14.

A display device 25 having an LED, LCD, or other display screen is connected to the display interface 15. A network 26 such as the internet is connected to the network interface 16, providing a configuration enabling access to an external server, cloud, or the like. The network 26 is a configuration for obtaining the necessary data and the like and may be a storage medium or input device for performing data input. Moreover, this computer system may be provided with another configuration, and the configuration of FIG. 1 is but one example.

Figure 2:
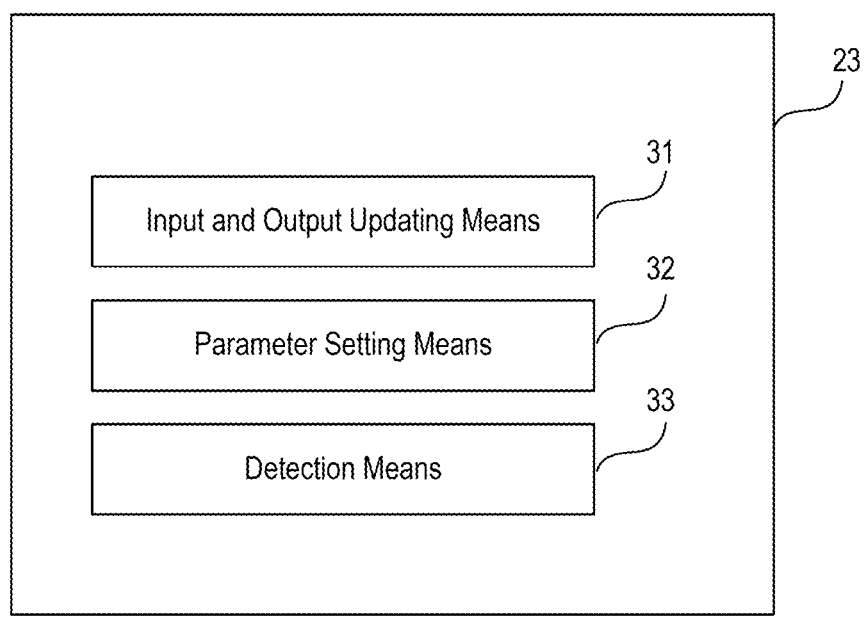
FIG. 2 is a functional block diagram of the hardware trojan detection device of the first embodiment of the present invention.

FIG. 2 is a functional block diagram of the hardware trojan detection device 1 of the first embodiment of the present invention. In the above, the CPU 10 realizes each means and the like given in FIG. 2 by using a hardware trojan detection program in the external storage device 23. That is, provided are an input and output updating means 31, a parameter setting means 32, and a detection means 33.

The input and output updating means 31 updates input and output values of all logic cells by performing computations according to logical expressions of all logic cells included in a netlist to be verified. That is, the input and output updating means 31 performs the above computation for all logic cells in a constituent-net scope if the verification target is a constituent net, performs the above computation for all logic cells in an aggregate-net scope if the verification target is an aggregate net, and performs the above computation for all logic cells in the entirety of an LSI if the verification target is the entirety of an LSI. In this first embodiment and a second embodiment that is described below, the input and output updating means 31 updates the input and output values of all logic cells by performing the above computation for all logic cells in constituent nets included in the netlist to be verified. The parameter setting means 32 sets a parameter as an initial value for input and output nets of all logic cells. The netlist to be verified is design data describing a list of wiring mutually connecting various circuits included in an LSI or the Ike in development. The netlist to be verified has a hierarchy constructed to match a hierarchy of circuits constituting the LSI or the like in development and is provided with an aggregate net, which is the highest layer, and a constituent net, which is a layer below the aggregate net. One or more aggregate nets and constituent nets are provided according to the scale of the information processing device. The constituent net is configured by a group of circuits connected by wiring connecting circuit terminals ("interterminal net"). Moreover, logic cells are included in the various circuits included in the LSI or the like in development.

In the present embodiment, the above input and output updating means 31 updates the input values and the output values by performing a predetermined number of courses of the above computation using the above set parameter for all logic cells.

The logic cell includes a logic circuit and, when necessary, a buffer and a repeater other than the logic circuit. In processing of updating the input values and the output values in each course, the above input and output updating means 31, when updating the buffer and the repeater, performs updating a predetermined number of times until the input values are transmitted to an output of the buffer or the repeater. For example, when performing one course of the above computation for all logic cells in a constituent net, for the buffer or the repeater, updating of the input and output values is performed that corresponds to updating by performing the above computation ten times.

The detection means 33 performs hardware trojan detection based on a result of comparing the updated input and output values with a threshold. The detection means 33 of the present embodiment performs hardware trojan detection based on the output value of any logic cell obtained when the predetermined number of courses of the above computation is performed.

In the present embodiment, the above detection means 33 performs hardware trojan detection in the above netlist to be verified based on a comparison between a circuit-scale-corresponding threshold, which is a threshold corresponding to a circuit scale based on the above netlist to be verified, and the input and output values of any logic cell obtained when the predetermined number of courses of the above computation is performed. Specifically, in a circuit wherein an interterminal net count, which represents a circuit scale of the constituent nets included in the netlist to be verified, is about 500, when the predetermined number of courses is made to be four courses, the value of the parameter is about 2.8e-8. Using this parameter, the comparison can be performed by an output value of 1e-7 and an input value of 1−(1e-7) for the circuit-scale-corresponding threshold. That is, a hardware trojan can be determined to be present if the output value is 1e-7 or less, and a hardware trojan can be determined to be present if the input value is 1−(1e-7) or more.

Including the netlist to be verified, netlists are a hierarchical structure corresponding to the hierarchy of a circuit constituting a device such as an LSI that is generally made from a netlist. The highest layer in this hierarchy is referred to as an aggregate net, and a constituent net is provided in a layer below this aggregate net. One or more aggregate nets and constituent nets are respectively present according to the scale of the LSI or other device. Among these, the constituent net is configured by a group of circuits connected by wiring referred to as interterminal nets provided between circuit terminals. In the present embodiment, the input and output values of all logic cells are updated by performing the above computation for all logic cells in a constituent net.

Figure 3:
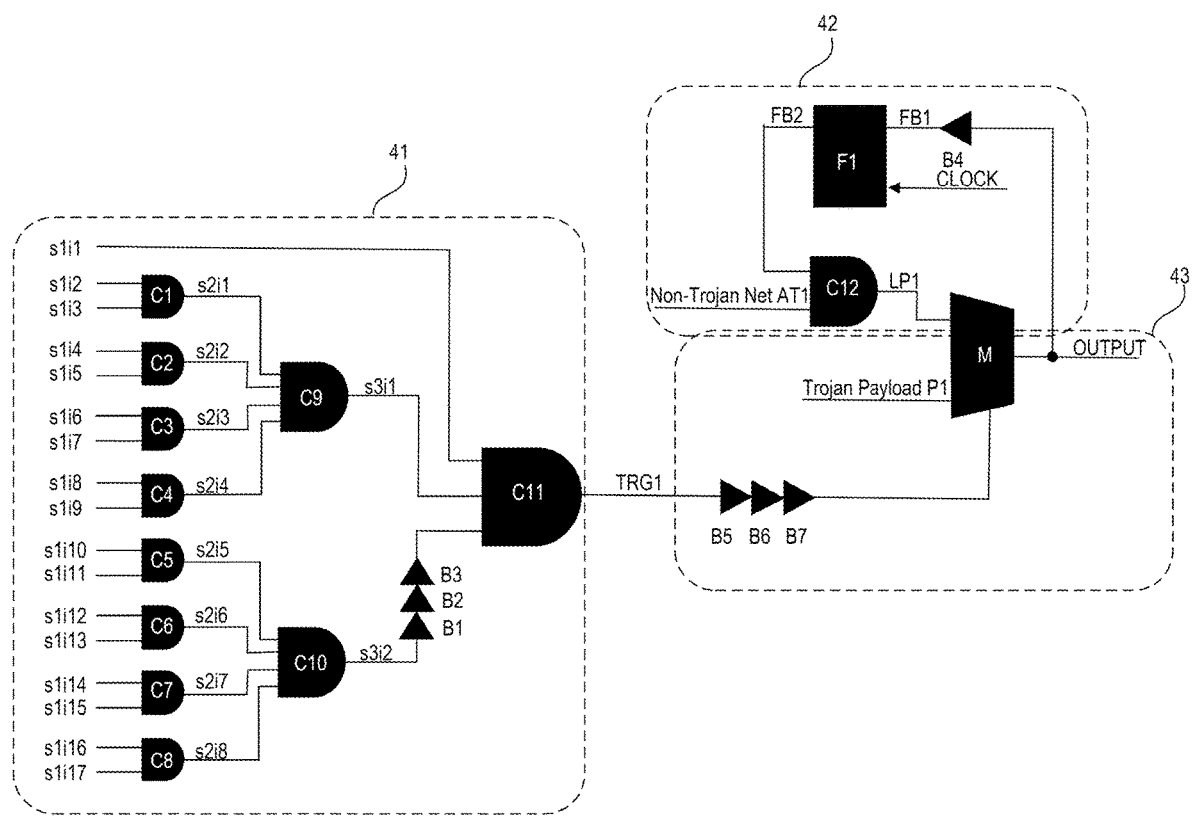
FIG. 3 is a diagram illustrating one example of a constituent net of a netlist wherein the hardware trojan detection device of the first embodiment of the present invention detects a hardware trojan.

FIG. 3 illustrates one example of a constituent net. This constituent net is provided with a suspected trojan circuit portion 41 wherein a hardware trojan may be present, a non-trojan circuit portion 42 wherein no hardware trojan is present, and a remaining circuit portion 43 that is a remaining portion.

The suspected trojan circuit portion 41 is provided with AND gates C1 to C11 that are logic cells, and the logic cells are connected by interterminal nets s1$i$1 to s1$i$17, s2$i$1 to s2$i$8, s3$i$1, and s3$i$2. Three cascaded buffers B1 to B3 are provided between the AND gate C10 and the AND gate C11.

The non-trojan circuit portion 42 is provided with an AND gate C12, a D flip-flop F1, a portion of a multiplexer M, and a buffer B4 and has interterminal nets FB1, FB2, LP1, a non-trojan net AT1, an output net OUTPUT of the multiplexer M, and the like.

The remaining circuit portion 43 is provided with three cascaded buffers B5 to B7 and a portion of the multiplexer M and has as interterminal nets an output net TRG1 of the AND gate C11, nets connecting the buffers B5 to B7, a net P1 of a payload of a trojan that reaches one input of the multiplexer M, the output net OUTPUT of the multiplexer M, and the like.

Figure 4:
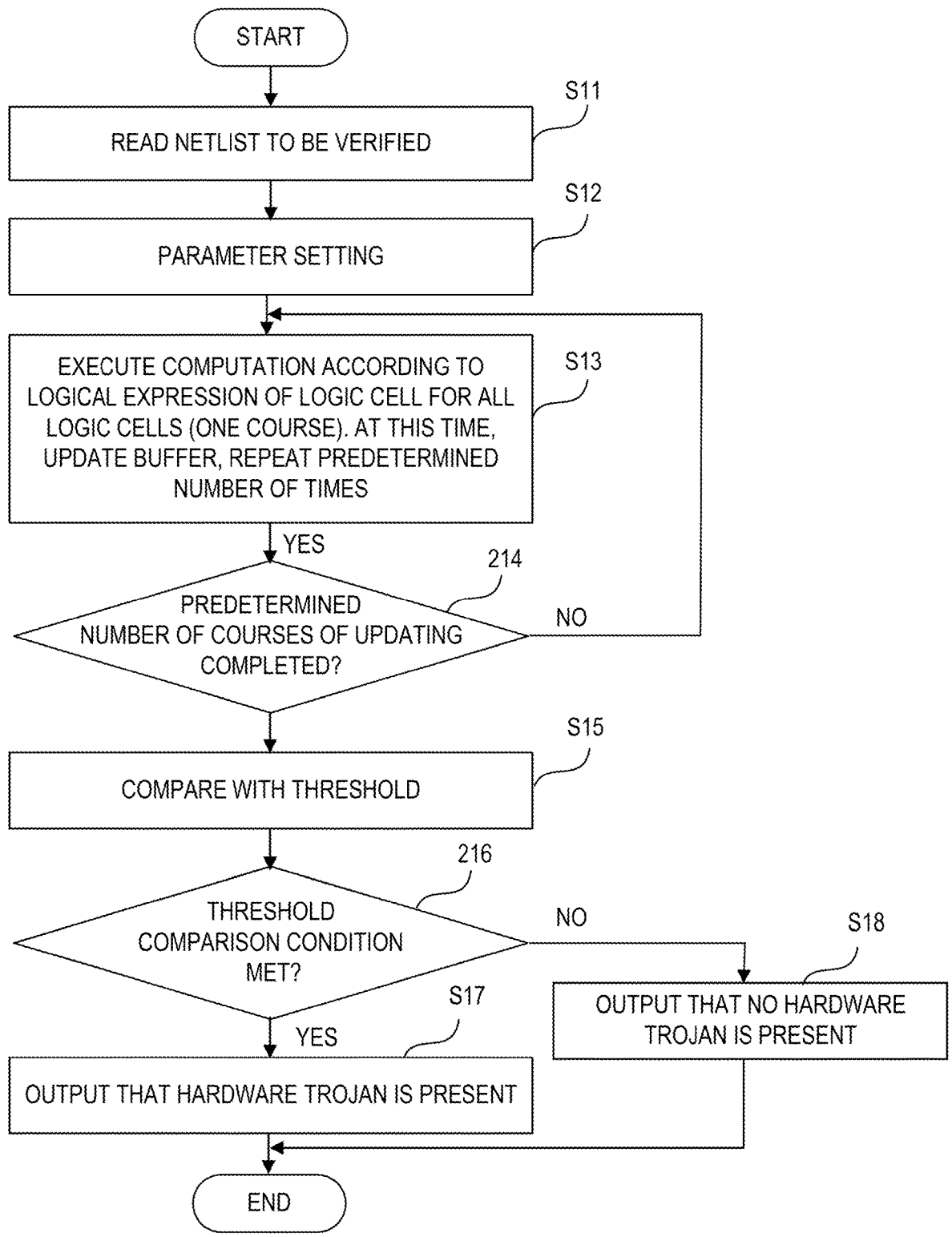
FIG. 4 is a flowchart illustrating operations of the hardware trojan detection device of the first embodiment of the present invention.

The hardware trojan detection program in the CPU 10 external storage device 23 performs operations on a constituent net such as above as illustrated in the flowchart in FIG. 4. Accordingly, the operations are described based on this flowchart. The CPU 10 reads the netlist to be verified (S11). This reading of the netlist to be verified can be performed, for example, from the external storage device 23. It can also be performed by accessing an external server, cloud, or the like via the network interface 16 and the network 26.

Next, the CPU 10 uses the read netlist to set a parameter as the initial value for the input and output nets of all logic cells (S12).

Figure 5:
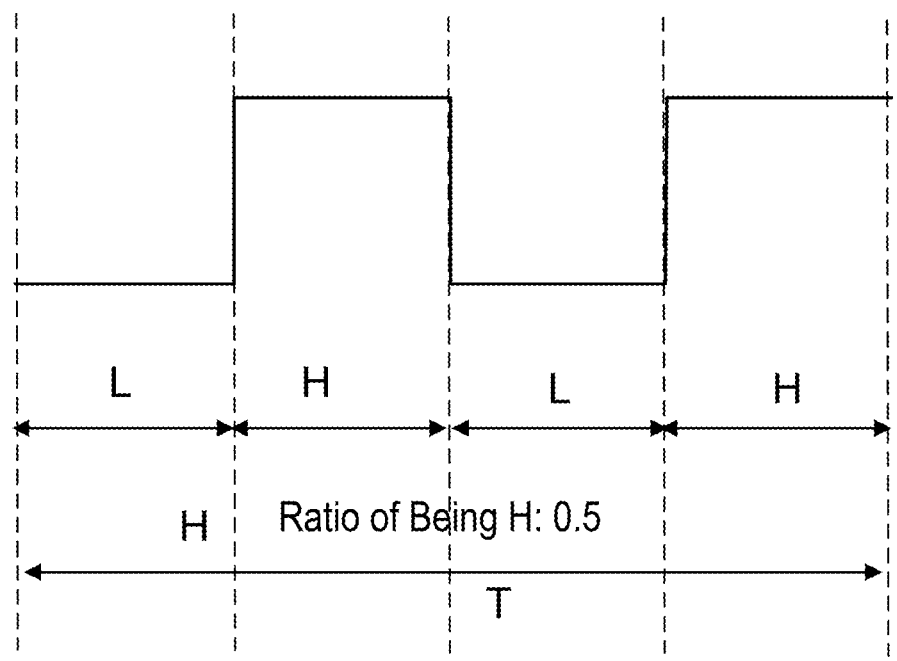
FIG. 5 is an explanatory diagram of a parameter et in hardware trojan detection devices of embodiments of the present invention.
Figure 6:
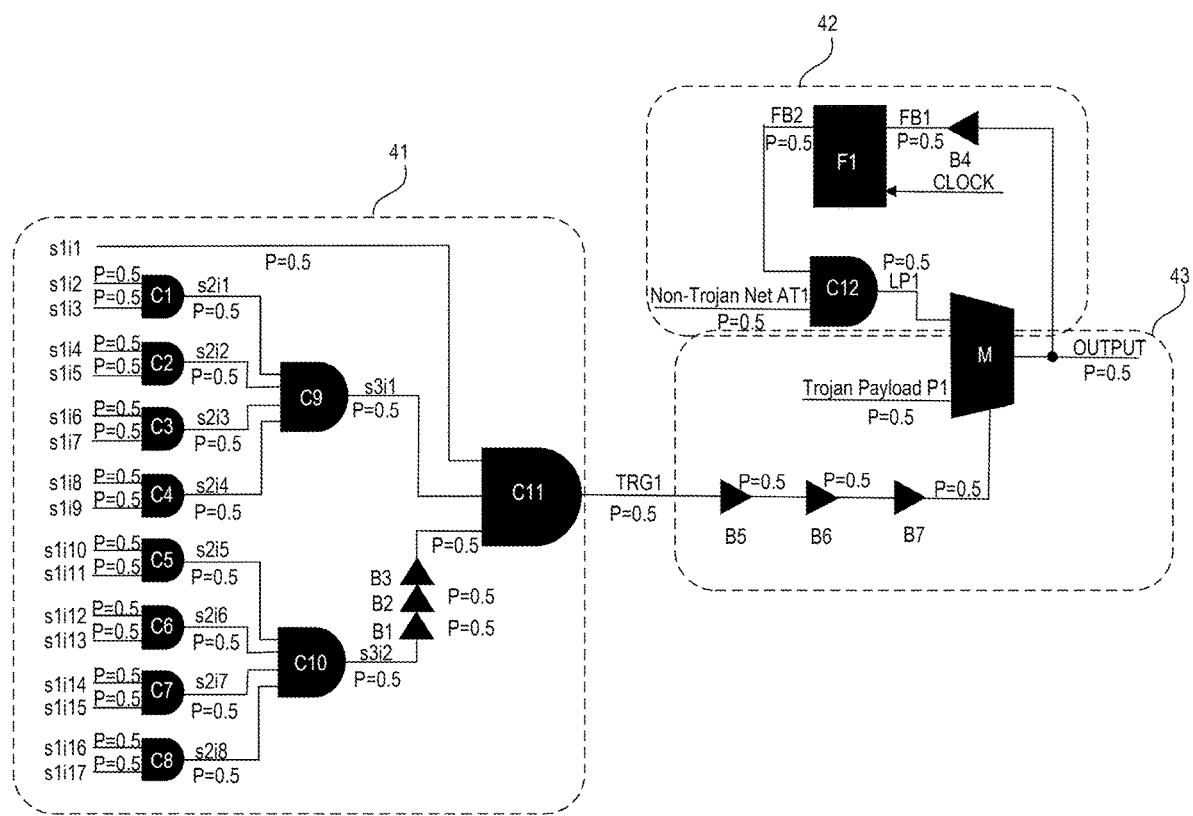
FIG. 6 is a diagram of the constituent net shown in FIG. 3 illustrating a situation wherein the parameter is set for the constituent net.

The parameter used in the above is determined, for example, as follows. As illustrated in FIG. 5, signals input to and output from a logic cell used in an LSI or other device that is the target of the present embodiment have a value that is either H level or L level; the signal is one of these levels. Accordingly, supposing that the H level and the L level change as in FIG. 5, a ratio of the signal being H (L) level during a time T is 0.5. As the parameter, this 0.5 is set as the initial value for the input and output nets of all logic cells. The result of this is as illustrated in FIG. 6.

Figure 7:
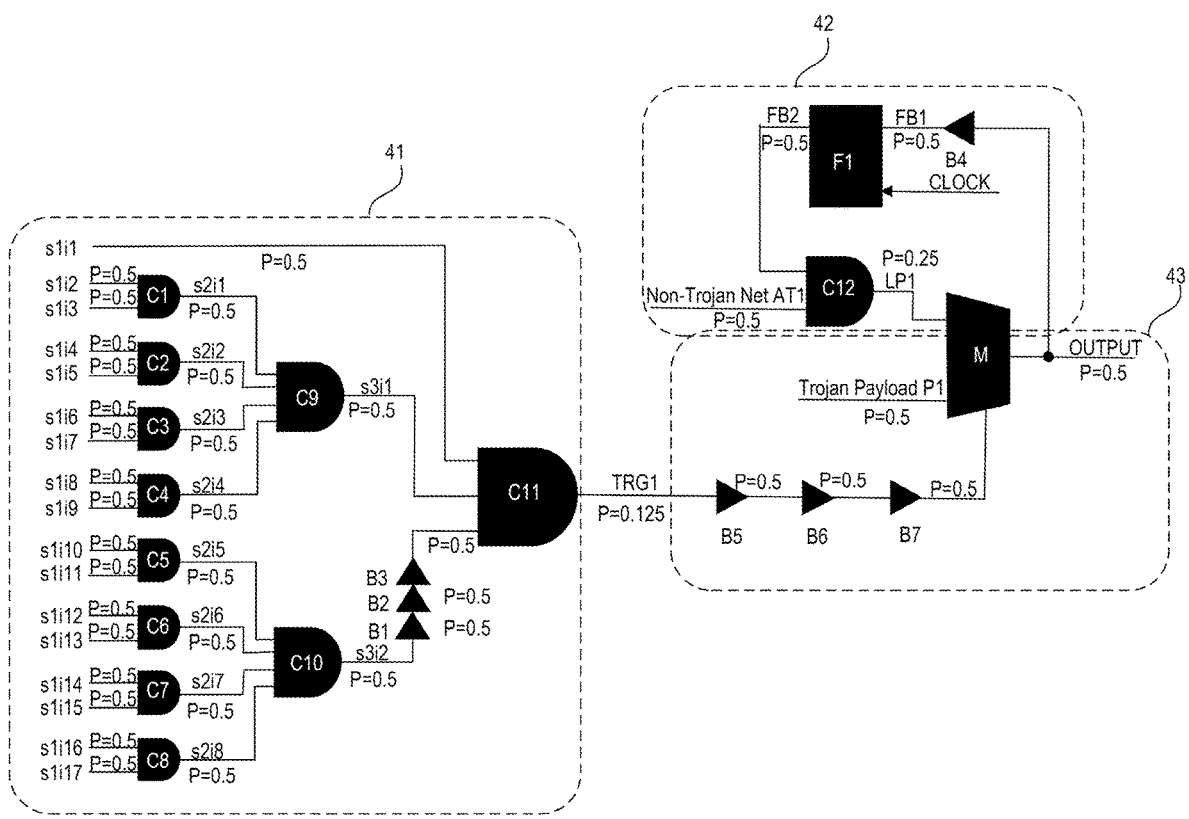
FIG. 7 is a diagram illustrating a state wherein updating is performed by computations according to logical expressions of logic cells for the constituent net illustrating the situation wherein the parameter is set for the constituent net shown in FIG. 3.

Next, in the above computation using the above set parameter, the input values and the output values are updated for all logic cells (S13). Here, the computing according to the above computation may start from anywhere and is in random order. FIG. 7 illustrates a result of performing computation on an output side for the AND gate C11 and the AND gate C12. In this situation, the above computation is performed according to the expressions given in FIG. 8.

Figure 9:
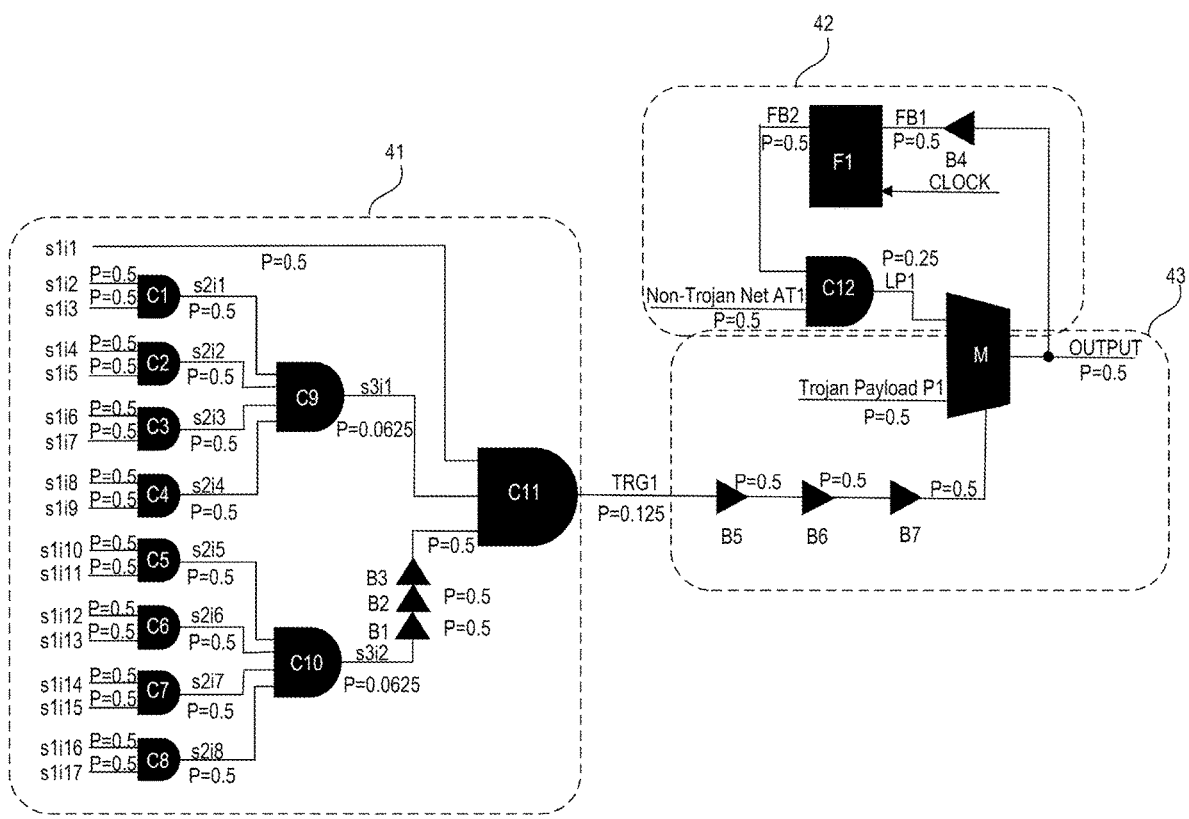
FIG. 9 is a diagram illustrating a state wherein updating is performed by the computations according to the logical expressions for the logic cells of the constituent net illustrating the situation wherein the parameter is set for the constituent net shown in FIG. 7.
Figure 10:
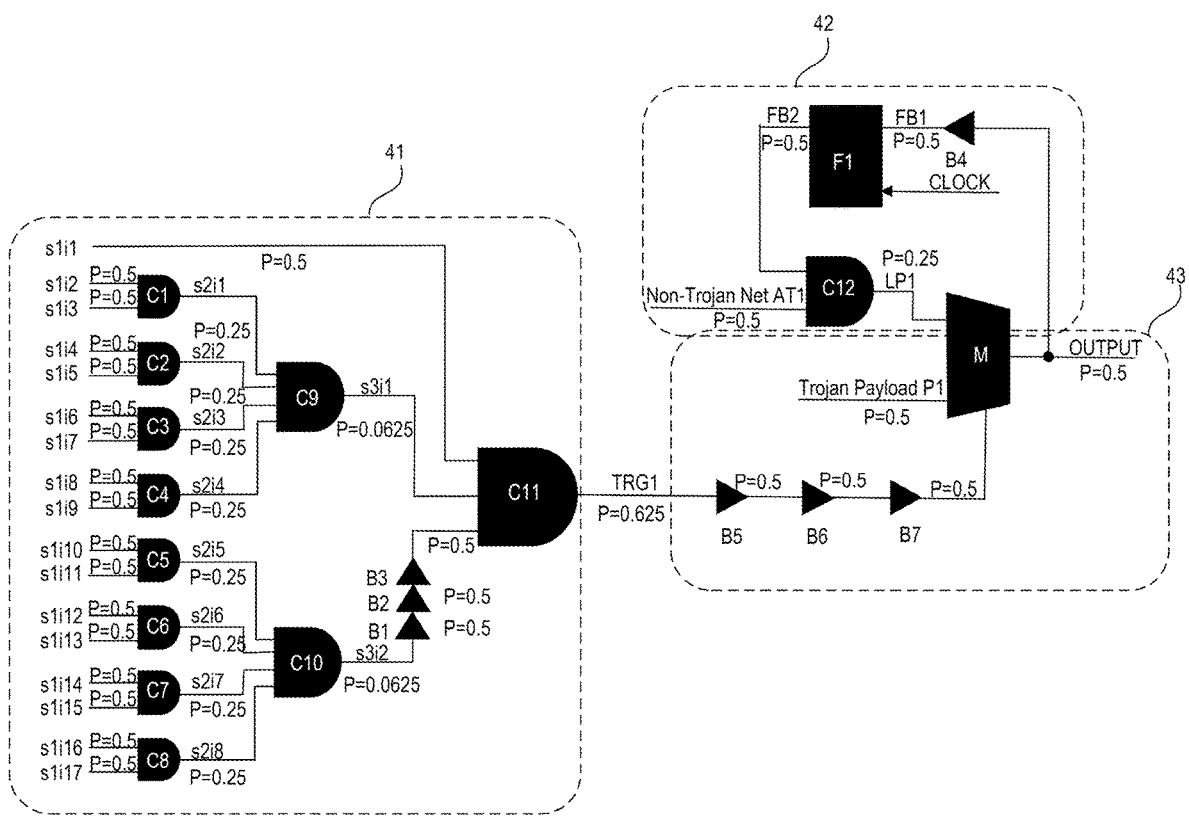
FIG. 10 is a diagram illustrating a state wherein updating is performed by the computations according to the logical expressions for the logic cells of the constituent net illustrating the situation wherein the parameter is set for the constituent net shown in FIG. 9.

FIG. 9 illustrates a result of continuing computation downstream from the AND gate C11 and performing computation for respective outputs of the AND gate C9 and the AND gate C10. Moreover, FIG. 10 illustrates a result of performing computation for respective inputs of the AND gate C9 and the AND gate C10.

Figure 11:
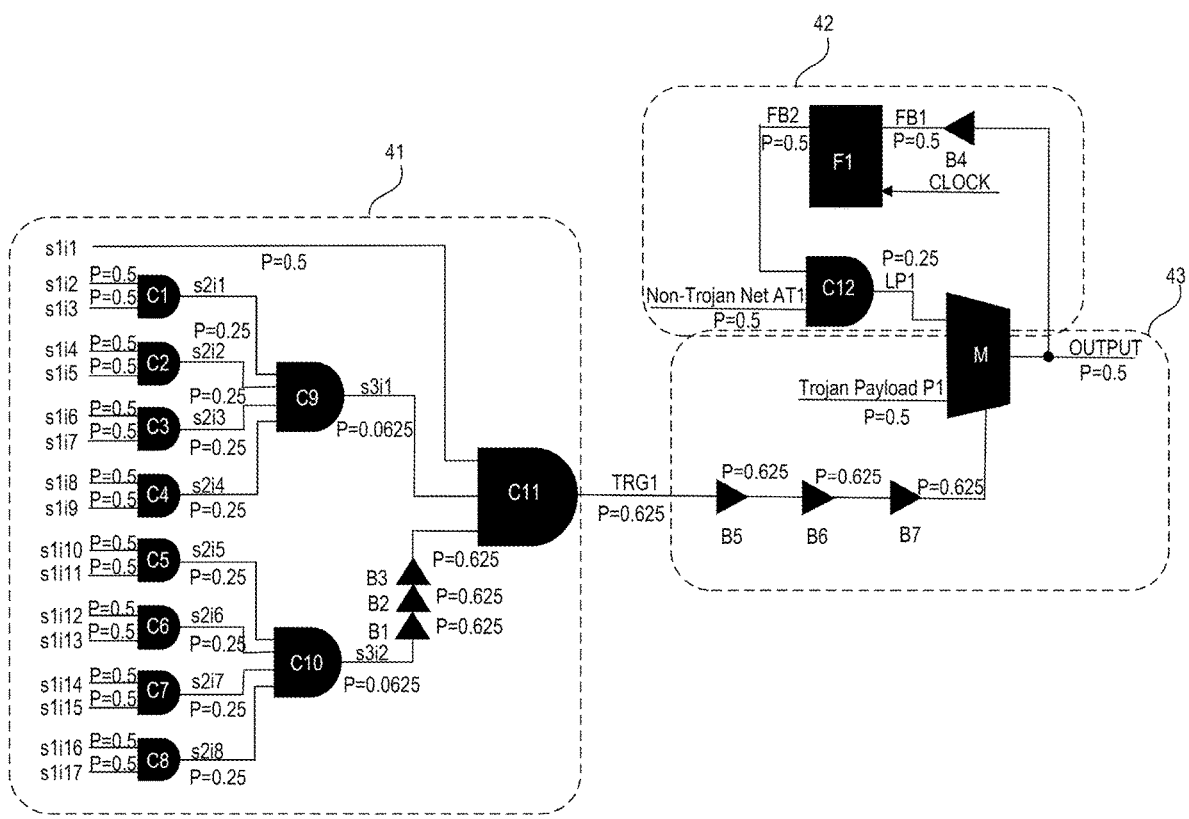
FIG. 11 is a diagram illustrating a state wherein updating is performed by the computations according to the logical expressions for the logic cells of the constituent net illustrating the situation wherein the parameter is set for the constituent net shown in FIG. 10.

FIG. 11 illustrates an example wherein, in updating a buffer and a repeater, updating is performed a predetermined number of times until the input values are transmitted to an output of the buffer or the repeater. When performing one course of the above computation for all logic cells in the constituent net, for the buffer or the repeater, updating of the input and output values is performed that corresponds to updating by performing the above computation ten times. As a result, at the three buffers B1 to B3, the output 0.0625 of the AND gate C10 is sequentially transmitted. Because a timing of the output of the AND gate C10 changes is variable, here, updating of the input and output values is performed that corresponds to updating by performing the above computation ten times.

Furthermore, FIG. 11 illustrates that the output 0.0625 of the AND gate C11 is sequentially transmitted at the three buffers 35 to 37. In updating the input and output values of the three buffers B5 to B7 as well, a timing of the output of the AND gate C11 changes is variable. Accordingly, here, updating of the input and output values is performed that corresponds to updating by performing the above computation ten times. In this example, the buffer input and output updates are performed at the timing illustrated in FIG. 11. However, another timing can be used.

When, as above, in the above computation using the above set parameter, updating of the input values and the output values for all logic cells is completed (when one course of updating is completed), it is detected whether the predetermined number of courses (here, four courses) of updating is completed (S14). If this is NO, the flow returns to step S13, and the processing continues.

Figure 12:
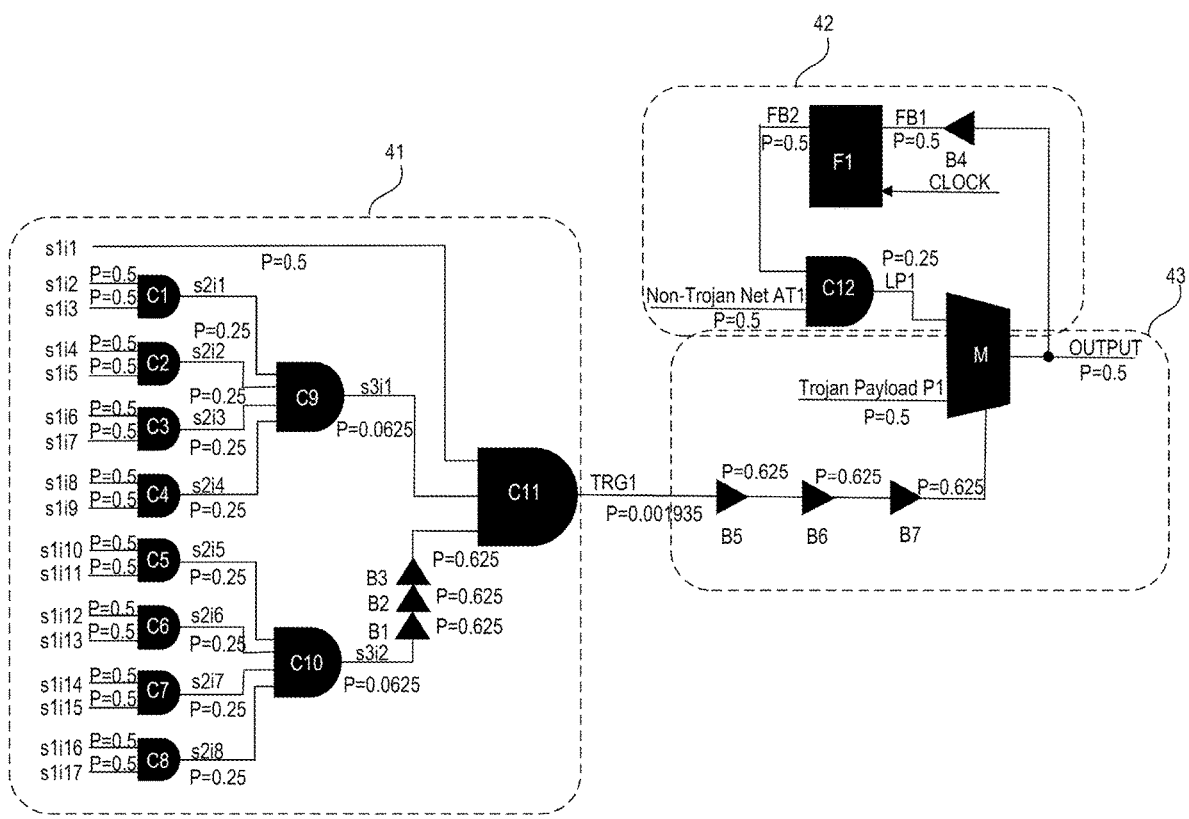
FIG. 12 is a diagram illustrating a second course of updates by the computations according to the logical expressions for the logic cells of the constituent net illustrating the situation wherein the parameter is set for the constituent net shown in FIG. 11.

When the flow returns to step S13, this becomes the second course of processing. From the end of the first course illustrated in FIG. 11 above, in the second course of processing illustrated in FIG. 12, the output of the AND gate C11 is updated to 0.001935. Thereafter, the input and output values of the logic cells downstream of the AND gate C11 are updated, and the input and output values of the logic cells upstream of the AND gate C11 are updated. This second course of updating is also in random order. Thereafter, operations continue in the same manner as the operations described in the first course of processing. When, in this manner, the second course of processing ends, the third course of processing then starts and ends, and the fourth course of processing starts and ends, step S14 becomes YES, and the flow proceeds to step S15.

At step S15, the CPU 10 compares the threshold described above (1e-7 for the output value, 1−(1e-7) for the input value) with the input value and output value of each logic cell (S15) to determine whether the output value is 1e-7 or less or the input value is 1−(1e-7) or more, this being the determining condition (S16).

When step S16 above is YES, a hardware trojan is determined to be present, and output processing such as displaying this determination on the display device 25 is performed (S17). When step S16 above is NO, it is determined that no hardware trojan is present, and output processing such as displaying this determination on the display device 25 is performed (S18).

Figure 13:
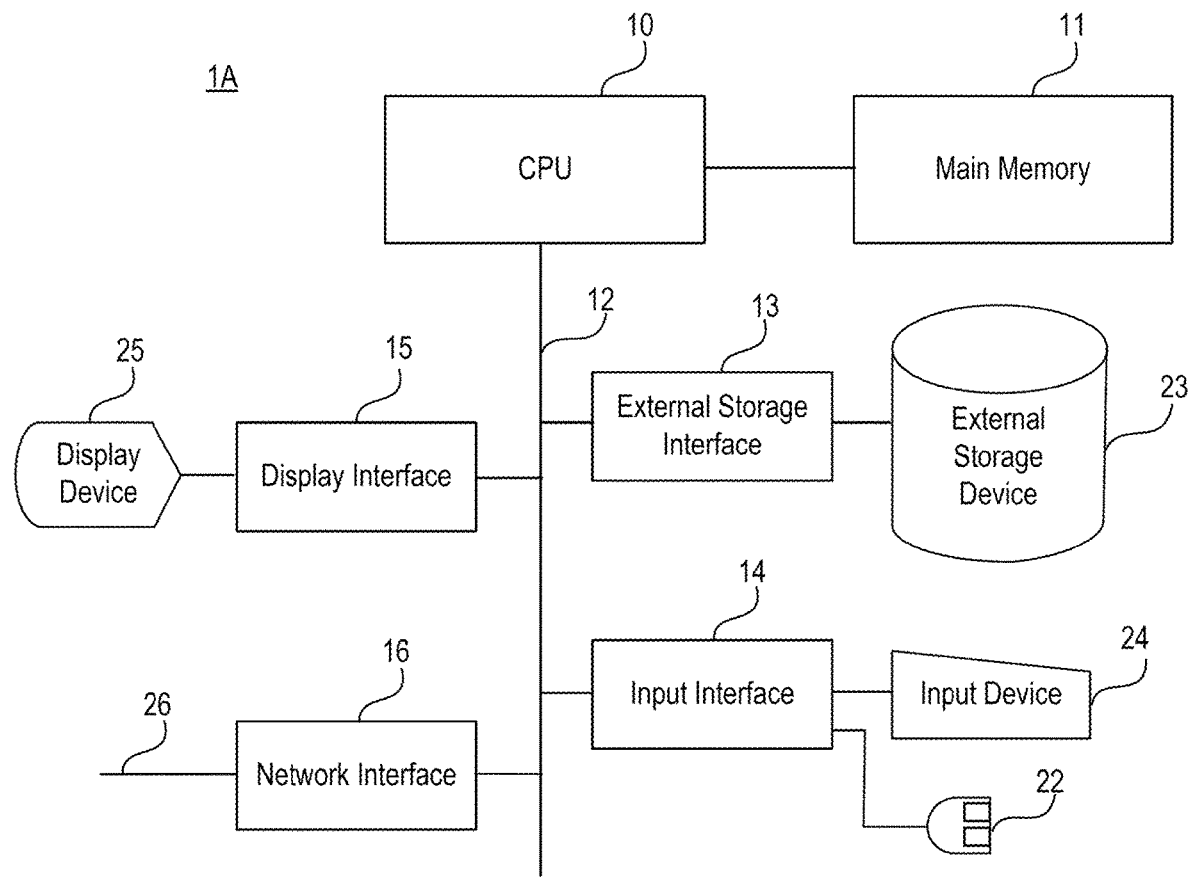
FIG. 13 is a configuration diagram of the computer system that realizes a hardware trojan detection device of a second embodiment of the present invention.

Next, a hardware trojan detection method, a hardware trojan detection device, and a hardware trojan detection program of the second embodiment of the present invention are described. In the embodiments of the hardware trojan detection method and the hardware trojan detection device of the second embodiment as well, a hardware trojan detection device 1A is realized by the same computer system, illustrated in FIG. 13, as the hardware trojan detection device 1 of the first embodiment of the present invention.

Figure 14:
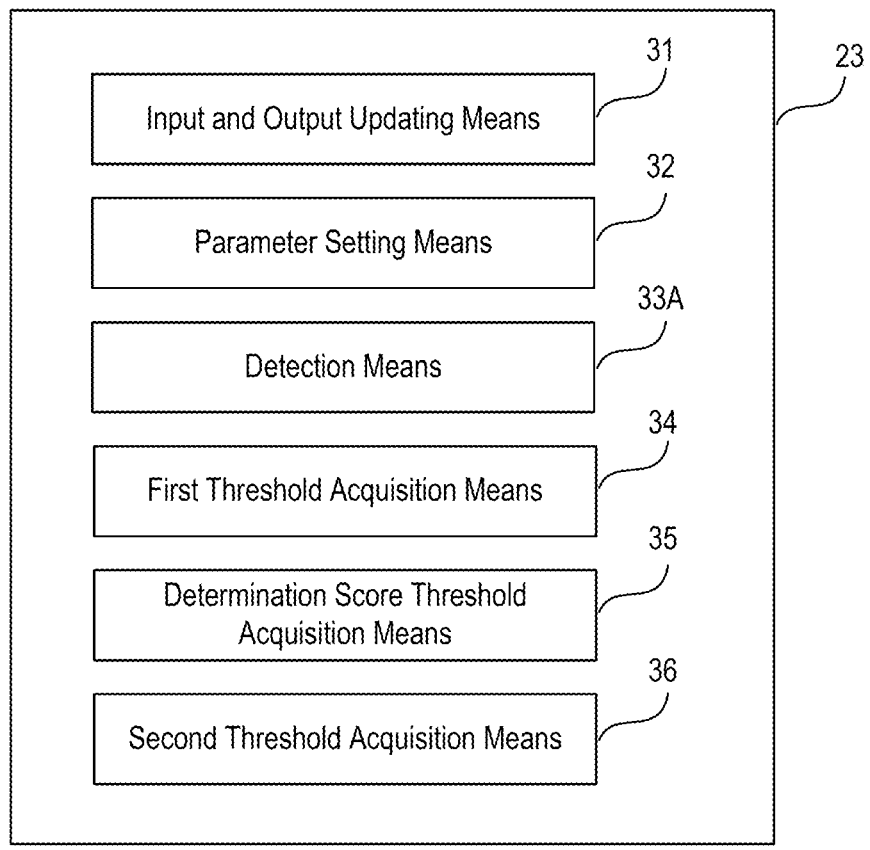
FIG. 14 is a functional block diagram of the hardware trojan detection device of the second embodiment of the present invention.

FIG. 14 illustrates a functional block diagram of the hardware trojan detection device 1A of the second embodiment of the present invention. In the hardware trojan detection device 1A of the second embodiment, the CPU 10 realizes each means and the like given in FIG. 14 by using the hardware trojan detection program in the external storage device 23. That is, like the first embodiment, the input and output updating means 31 and the parameter setting means 32 are provided. In addition to the input and output updating means 31 and the parameter setting means 32, a detection means 33A, a first threshold acquisition means 34, a determination score threshold acquisition means 35, and a second threshold acquisition means 36 are provided.

The first threshold acquisition means 34 uses a known netlist including a hardware trojan and a known netlist including no hardware trojan to perform the processing by the above parameter setting means 32 and the above input and output updating means 31, finding a first threshold based on the input and output values in the constituent net obtained when the predetermined number of courses of the above computation in this input and output updating means 31 is performed. The above detection means 33A performs hardware trojan detection using the above first threshold.

In the present embodiment, the known netlists and the netlist to be verified are configured at least including an aggregate net including one or more constituent nets configured by a group of circuits connected by interterminal nets. The first threshold acquisition means 34 acquires the first threshold for each constituent net.

The determination score threshold acquisition means 35 imparts scores of predetermined values according to magnitude relationships between, on one hand, maximum and minimum input and output values in each constituent net in the known netlists and, on the other, the first threshold. Maximum scores of the scores imparted to the constituent nets are totaled for each aggregate net in the known netlists, and the obtained aggregate-net scores are compared to obtain a determination score threshold based on the smallest aggregate-net score. Here, in the determination score threshold acquisition means 35 executing the above processing, the aggregate net having the maximum score is referred to as a "maximum score net," and a number of maximum score nets in the known netlists is referred to as a "maximum score net count."

The detection means 33A imparts scores of predetermined values according to a magnitude relationship with the first threshold for each netlist to be verified; obtains a score to be verified by totaling, for each aggregate net of the netlist to be verified, maximum scores of the scores imparted to the constituent nets; and performs hardware trojan detection in the netlist to be verified by evaluating the score to be verified based on the determination score threshold.

The second threshold acquisition means 36 extracts, from among a plurality of known netlists, a known netlist predicted to include a hardware trojan matching the following conditions: a count of clock cycles of outputting a constant value in a predetermined amount of time is a predetermined value or higher, and a maximum score net count is at or below a maximum score net count threshold. Using the extracted known netlist, the processing by the above parameter setting means 32 and the above input and output updating means 31 is performed. A second threshold is found based on an output value obtained when the predetermined number of courses of the above computation in this input and output updating means 31 is performed.

The present embodiment can use, for example, netlists of benchmarks published on the US website (Trust-HUB). Ten such benchmarks are selected. Those including a hardware trojan are indicated as (HT-inserted), and those including no hardware trojan are indicated as (HT-free). This provides the following Table 1.

TABLE 1

| Benchmark | Type | Net count |
| --- | --- | --- |
| b19 | HT-free | 108,332 |
| EthernetMAC10GE | HT-free | 103,206 |
| S35932 | HT-free | 6,423 |
| EthernetMAC10GE-T700 | HT-inserted | 103,220 |
| RS232-T1000 | HT-inserted | 311 |
| s15850-T100 | HT-inserted | 2,456 |
| s38417-T100 | HT inserted | 5,819 |
| s38584-T200 | HT-inserted | 7,580 |
| vga_lcd-T100 | HT inserted | 70,162 |
| wb_conmax-T100 | HT inserted | 22,197 |

The well-known netlists of the benchmarks in Table 1 include one or more aggregate nets, and the aggregate nets include one or more constituent nets. In these constituent nets, an interterminal net that may be a trojan net, referred to as a "suspected trojan net," can be found; it is known that a constituent net including a suspected trojan net is included in a well-known netlist. This constituent net including a suspected trojan net is referred to as a control net, and JP 6566576 B2 discloses that nine types of control nets can be found from the benchmarks in Table 1.

In the present embodiment, however, the above nine types of control nets are not found. A known netlist including a hardware trojan and a known netlist including no hardware trojan (those of the above benchmarks) are used to perform the processing described in the first embodiment by the above parameter setting means 32 and the above input and output updating means 31. This finds the input and output values in the constituent net obtained when the predetermined number of courses of the above computation in this input and output updating means 31 is performed.

As a result of performing the above processing for all constituent nets of the known netlist including a hardware trojan and the known netlist including no hardware trojan (those of the above benchmarks), an output value is obtained that is a value near a numerical value TO having, for example, five or more zeros after a decimal point (for example, 1e-7) ("trojan presence output threshold"), and an input value is obtained that is a value near a numerical value TI, which is TO subtracted from 1 (for example, 1−(1e-7)) ("trojan presence input threshold").

The first threshold acquisition means 34 obtains respective average values of the trojan presence output thresholds and the trojan presence input thresholds obtained from all constituent nets; these are made to be the first threshold. Moreover, when trojan presence output thresholds are obtained that are different by one or more decimal places, as in 1e-7 and 1e-6, the above average value is found for each as a trojan presence output threshold 1 and a trojan presence output threshold 2. Moreover, here, when a trojan presence input threshold 1 and a trojan presence input threshold 2 are obtained, an average value is also found for each of these. A plurality of first thresholds—a first threshold 1 and a first threshold 2—is then obtained.

Figure 15:
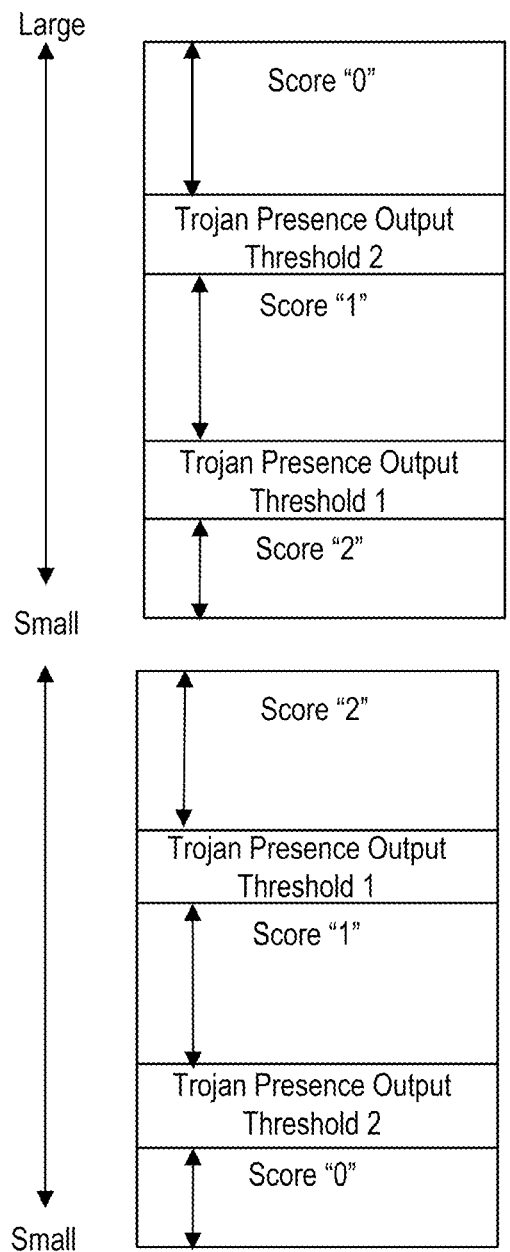
FIG. 15 is a diagram illustrating a conversion table for a first threshold and a score used in the hardware trojan detection device of the second embodiment of the present invention.

The determination score threshold acquisition means 35 imparts a score to each input and output value in the constituent net. As illustrated in FIG. 15, the score is 2 when the output value is at or below the trojan presence output threshold 1, 1 when the output value is greater than the trojan presence output threshold 1 and at or below the trojan presence output threshold 2, and 0 when the output value is greater than the trojan presence output threshold 2. Moreover, as illustrated in FIG. 15, the score is 2 when the input value is at or above the trojan presence input threshold 1, 1 when the input value is less than the trojan presence input threshold 1 and at or above the trojan presence input threshold 2, and 0 when the input value is less than the trojan presence input threshold 2.

The score is imparted to all input values and all output values of the constituent net. Maximum scores of the scores imparted to the constituent nets are totaled for each aggregate net of the known netlists. Therefore, in the constituent nets, a score corresponding to an output value less than the trojan presence output threshold becomes a maximum score, or a score corresponding to an input value greater than the trojan presence input threshold becomes a maximum score.

Next, the maximum scores are totaled for all aggregate nets in the known netlists. Therefore, a total score is large in a known netlist including many constituent nets and aggregate nets having a high possibility of including a hardware trojan. Netlist scores obtained in this manner are compared to obtain the determination score threshold based on the smallest netlist score. For example, a value wherein 1 is added to the smallest known netlist score is made to be the determination score threshold. Using the known netlists of the benchmarks in Table 1, 3 is found as the determination score threshold.

The above detection means 33A imparts a score of a predetermined value according to a magnitude relationship between the input and output values and the first threshold for each constituent net of the netlist to be verified. In this operation, the detection means 33A uses the first threshold found by the first threshold acquisition means 34 to impart the score of the predetermined value according to the magnitude relationship between the input and output values and the first threshold for each constituent net of the netlist to be verified. The score is imparted using data of the conversion table for the first threshold and the score illustrated in FIG. 15.

Like the score imparting by the detection means 33A, scores are imparted to all input values and all output values of the constituent nets. Maximum scores of the scores imparted to the constituent nets are totaled for each aggregate net of the known netlists. Therefore, in the constituent nets of the netlist to be verified, a score corresponding to an output value less than the trojan presence output threshold becomes a maximum score, or a score corresponding to an input value greater than the trojan presence input threshold becomes a maximum score.

Next, the maximum scores are totaled for all aggregate nets of the netlist to be verified, and the score to be verified is obtained. This score to be verified and the determination score threshold (in the example described above, 3) are compared to perform hardware trojan detection in the above netlist to be verified. Specifically, when the score to be verified is at or above the determination score threshold (in the example described above, 3), a hardware trojan is determined to be present, and output processing such as displaying this determination on the display device 25 is performed.

As illustrated in FIG. 14, this second embodiment is provided with the second threshold acquisition means 36. The second threshold acquisition means 36 extracts, from among a plurality of known netlists, a known netlist predicted to include a hardware trojan matching the following conditions: a count of clock cycles of outputting a constant value in a predetermined amount of time is a predetermined value or higher, and a maximum score net count is at or below a maximum score net count threshold.

In the determination score threshold acquisition means 35, a score of a predetermined value is imparted according to a magnitude relationship between the input and output values and the first threshold in each constituent net in the known netlists, and maximum scores of the scores imparted to the constituent nets are totaled for all aggregate nets of the known netlists.

In examining a relationship between the above maximum score net count and trojan-net inclusion for the known netlists of the benchmarks given in Table 1, when a well-known trojan net is included, the maximum score net count is relatively low, and the greatest value of the maximum score net count (Xnumber) is 5, in the benchmark (s38417-T100). In this manner, regarding whether a well-known trojan net is included/not included, the maximum score net counts (Xnumber) of a plurality of known netlists can be examined, and the greatest maximum score net count (Xnumber) among those examined can be made to be the maximum score net count threshold (Tnumber). A condition that the maximum score net count is at or below the maximum score net count threshold is a condition of being a known netlist including a well-known trojan ("net count condition").

Figure 16:
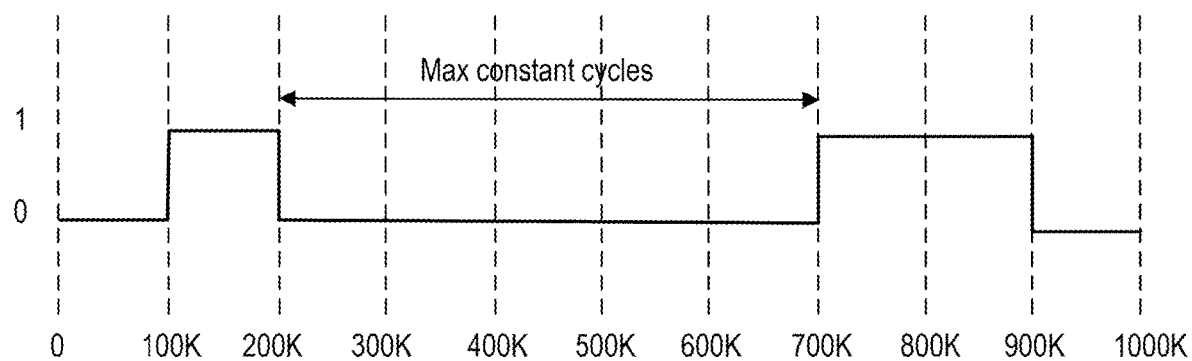
FIG. 16 is a waveform diagram illustrating that a constant value is output over a long period when a trojan net is present.

Meanwhile, as illustrated in FIG. 16 for example, the longest period of outputting a constant value in 1M clock cycles is referred to as a maximum constant cycle count (max constant cycles). The higher this maximum constant cycle count, the higher a possibility of the maximum score net including a trojan net. Since a likelihood of a trojan net operating is low, when a trojan net is present, a constant value is predicted to be output over a long period ("constant cycle count condition").

JP 6566576 B2 indicates that among the benchmarks given in Table 1, the benchmarks (RS232-T1000, s38417-

T100, and vga_lcd-T100) are benchmarks of known netlists meeting the above "constant cycle count condition" and the above "net count condition."

In this manner, the second threshold acquisition means 36 extracts the known netlists meeting the above "constant cycle count condition" and the above "net count condition" and uses the extracted known netlists to perform the processing by the above parameter setting means 32 and the above input and output updating means 31, finding the second threshold based on the output value obtained when the predetermined number of courses of the above computation in this input and output updating means 31 is performed.

The above processing of obtaining the output value by performing the predetermined number of courses of the above computation by the processing by the above parameter setting means 32 and the above input and output updating means 31 is the same other than the netlists to be processed being the netlists of the benchmarks (RS232-T1000, s38417-T100, and vga_lcd-T100) and is described in steps S11 to S15 in the flowchart in FIG. 4. Accordingly, a description is omitted here.

As above, the input and output values in the constituent net are found when the predetermined number of courses of the above computation in the input and output updating means 31 is performed. Among these, as the output value, a value near the numerical value TO having, for example, five or more zeros after a decimal point (for example, 1e-7) ("trojan presence output threshold") is obtained, and as the input value, a value near the numerical value TI, which is TO subtracted from 1 (for example, 1-(1e-7)) ("trojan presence input threshold"), is obtained.

The second threshold acquisition means 36 obtains respective average values for the trojan presence output thresholds and trojan presence input thresholds obtained from all constituent nets; these are made to be the second threshold. In the present embodiment, the netlists of three benchmarks are used. Accordingly, three second thresholds are generated. Ultimately, an average value is made to be the second threshold. Alternatively, the smallest trojan presence output threshold is made to be the second threshold, and the greatest trojan presence input threshold is made to be the second threshold.

The above detection means 33A uses the above second threshold to perform hardware trojan detection in the above netlist to be verified. This detection processing by the above detection means 33A is as illustrated by the flowchart in FIG. 4. In this flowchart, the threshold used at step S16 is the above second threshold.

Figure 17:
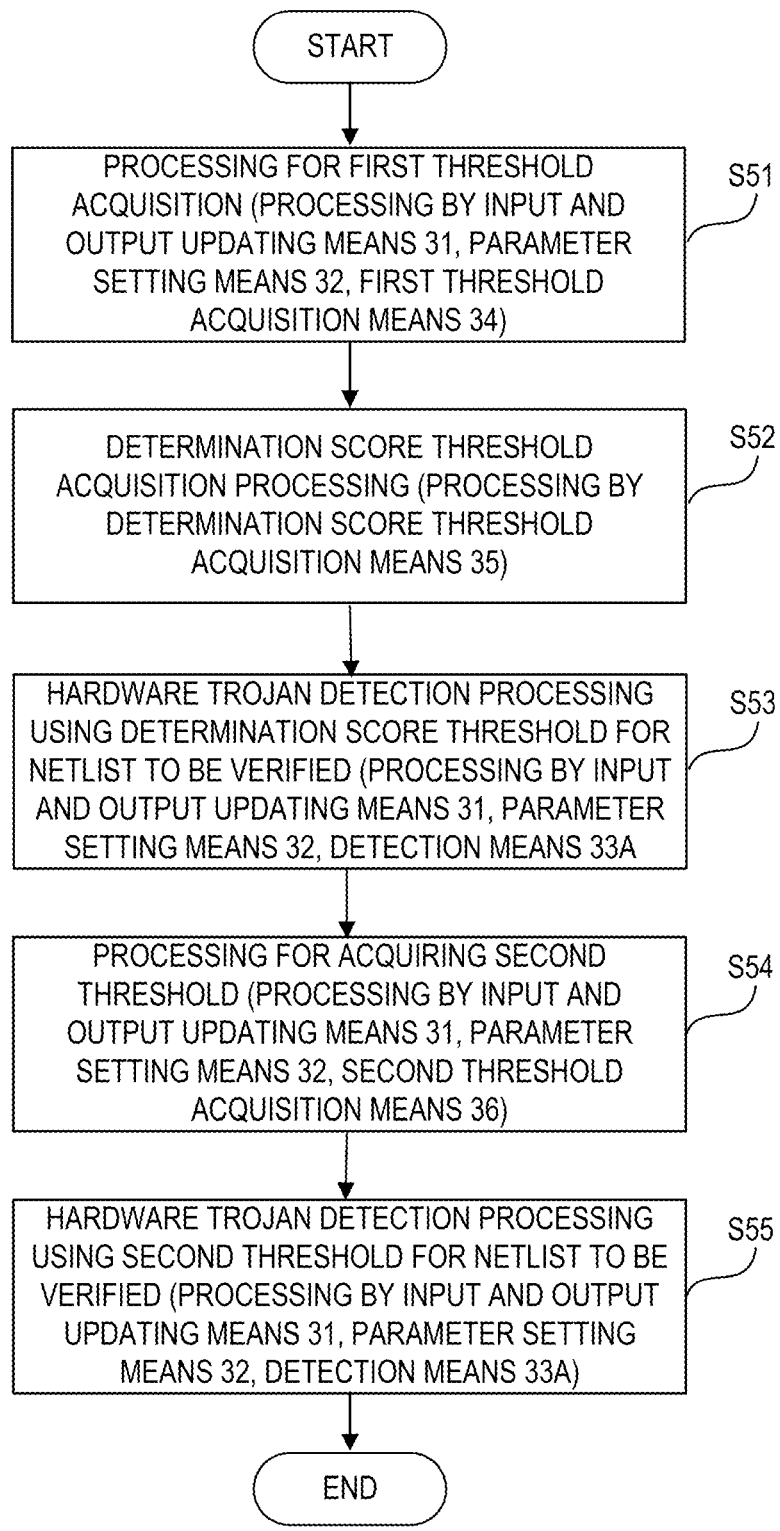
FIG. 17 is a flowchart illustrating hardware trojan detection processing by this second embodiment.

The flowchart in FIG. 17 illustrates this hardware trojan detection processing by the second embodiment as a processing procedure by the detection means 33A, the first threshold acquisition means 34, the determination score threshold acquisition means 35, and the second threshold acquisition means 36 in addition to the input and output updating means 31 and the parameter setting means 32.

First, processing for acquiring the first threshold is performed (S51). At this step S51, processing is performed by the input and output updating means 31, the parameter setting means 32, and the first threshold acquisition means 34. Next, processing of acquiring the determination score threshold is performed (S52). At this step S52, processing is performed by the determination score threshold acquisition means 35. Next, hardware trojan detection processing using the determination score threshold is performed for the netlist to be verified (S53). At this step S53, processing is performed by the input and output updating means 31, the parameter setting means 32, and the detection means 33A.

Next, processing for acquiring the second threshold is performed (S54). At this step S54, processing is performed by the input and output updating means 31, the parameter setting means 32, and the second threshold acquisition means 36. Moreover, hardware trojan detection processing using the second threshold is performed for the netlist to be verified (S55). At this step S55, processing is performed by the input and output updating means 31 the parameter setting means 32, and the detection means 33A.

As above, in both the first embodiment and second embodiment, the process of setting a parameter as an initial value for the input and output nets of all logic cells and updating the input values and the output values by performing the predetermined number of courses of the above computation using the above set parameter for all logic cells is the basic processing. It is anticipated that hardware trojan detection that is simple to process and does not take much time can be performed.

A plurality of embodiments of the present invention are described. However, these embodiments are presented as examples and are not intended to limit the scope of the invention. These novel embodiments can be implemented in various other forms, and various omissions, substitutions, and modifications can be made in scope without departing from the spirit of the invention. These embodiments and variations thereof are included in the scope and spirit of the invention and are included in the scope of equivalents with the inventions stated in the scope of the patent claims.

The number of well-known netlists and the number of control nets described in the embodiments are not limiting. The number of well-known netlists is but an example. Moreover, in the embodiments, the score of the control net is a numerical value that can change. The values of the maximum score threshold and the maximum score net count threshold can also change. The maximum score threshold and the maximum score net count threshold are but examples. Moreover, the maximum constant cycle count uses the longest period of outputting a constant value in 1M clock cycles, but the present invention is not limited thereto.

DESCRIPTION OF REFERENCE SIGNS

1 Hardware Trojan Detection Device Of First Embodiment
1A Hardware Trojan Detection Device Of Second Embodiment
11 Main Memory
12 Bus
13 External Storage Interface
14 Input Interface
15 Display Interface
16 Network Interface
22 Mouse
23 External Storage Device
24 Input Device
25 Display Device
26 Network
31 Input And Output Updating Means
32 Parameter Setting Means
33, 33A Detection Means
34 First Threshold Acquisition Means
35 Determination Score Threshold Acquisition Means
36 Second Threshold Acquisition Means
41 Suspected Trojan Circuit Portion
42 Non-Trojan Circuit Portion
43 Remaining Circuit Portion

The invention claimed is:

1. A hardware trojan detection method, comprising:
updating input and output values of logic cells by performing computations according to logical expressions of all logic cells included in a netlist to be verified; and
performing hardware trojan detection based on a comparison result between the updated input and output values and a threshold,
wherein:
the logic cells includes a logic circuit and a buffer and a repeater other than the logic circuit; and
at the input and output updating step, in each course of processing of updating the input values and the output values, when updating the buffer and the repeater, the method further comprises performing a predetermined number of updates until the input values are transmitted to an output of the buffer or the repeater.

2. The hardware trojan detection method of claim 1, further comprising:
setting a parameter as an initial value for input and output nets of all logic cells;
wherein the input values and the output values are updated by performing a predetermined number of courses of the computation using the set parameter for all logic cells, and hardware trojan detection is performed based on the output value of any logic cell obtained when the predetermined number of courses of the computation is performed.

3. The hardware trojan detection method of claim 1, further comprising:
using a known netlist including a hardware trojan and a known netlist including no hardware trojan to perform the parameter setting step and the input and output updating step and finding a first threshold based on input and output values in a constituent net obtained when a predetermined number of courses of the computation in the input and output updating step is performed;
wherein hardware trojan detection is performed using the first threshold.

4. The hardware trojan detection method of claim 3, wherein:
the known netlists and the netlist to be verified are configured to include at least an aggregate net including one or more constituent nets configured by a group of circuits connected by interterminal nets;
the first threshold is acquired for each constituent net;
the method further comprising:
imparting a score of a predetermined value according to a magnitude relationship between the input and output values and the first threshold in each constituent net in the known netlists,
totaling maximum scores of the scores imparted to the constituent nets for all aggregate nets of the known netlists, and
comparing obtained netlist scores, and obtaining a determination score threshold based on the smallest netlist score; and
wherein:
a score of a predetermined value is imparted according to a magnitude relationship between the input and output values and the first threshold for each constituent net of the netlist to be verified,
a score to be verified is obtained by totaling maximum scores of the scores imparted to the constituent nets for all aggregate nets of the netlist to be verified, and
hardware trojan detection in the netlist to be verified is performed by evaluating the score to be verified based on the determination score threshold.

5. The hardware trojan detection method of claim 1, further comprising:
extracting from among a plurality of known netlists a known netlist predicted to include a hardware trojan matching conditions of a count of clock cycles of outputting a constant value in a predetermined amount of time being a predetermined value or greater and a maximum score net count being at or below a maximum score net count threshold,
using the extracted known netlist to perform the parameter setting step and the input and output updating step, and
finding a second threshold based on an output value obtained when a predetermined number of courses of the computation in the input and output updating step is performed;
wherein hardware trojan detection in the netlist to be verified is performed using the second threshold.

6. The hardware trojan detection method of claim 1, wherein hardware trojan detection in the netlist to be verified is performed based on a comparison between a circuit-scale-corresponding threshold, which corresponds to a circuit scale based on the netlist to be verified, and input and output values of any logic cell obtained when a predetermined number of courses of the computation is performed.

7. A hardware trojan detection device, comprising:
a processor programmed to perform a hardware trojan detection method, comprising:
updating input and output values of logic cells by performing computations according to logical expressions of all logic cells included in a netlist to be verified; and
performing hardware trojan detection based on a comparison result between the updated input and output values and a threshold,
wherein:
the logic cells include a logic circuit and a buffer and a repeater other than the logic circuit; and
in each course of processing of updating the input values and the output values, when updating the buffer and the repeater, the processor performs a predetermined number of updates until the input values are transmitted to an output of the buffer or the repeater.

8. The hardware trojan detection device of claim 7, wherein the processor is further programmed to:
set a parameter as an initial value for input and output nets of all logic cells;
update the input values and the output values by performing a predetermined number of courses of the computation using the set parameter for all logic cells, and
perform hardware trojan detection based on the output value of any logic cell obtained when the predetermined number of courses of the computation is performed.

9. The hardware trojan detection device of claim 7, wherein the processor is further programmed to:
use a known netlist including a hardware trojan and a known netlist including no hardware trojan to set the parameter and update the input and output and find a first threshold based on input and output values in a constituent net obtained when a predetermined number of courses of the computation is performed;
wherein the hardware trojan detection is performed using the first threshold.

10. The hardware trojan detection device of claim 9, wherein:
the known netlists and the netlist to be verified are configured at least including an aggregate net including one or more constituent nets configured by a group of circuits connected by interterminal nets; and
the processor is further programmed to:
acquire the first threshold for each constituent net;
impart a score of a predetermined value according to a magnitude relationship between the input and output values and the first threshold in each constituent net in the known netlists,
total maximum scores of the scores imparted to the constituent nets for all aggregate nets of the known netlists,
compare obtained netlist scores, and obtain a determination score threshold based on the smallest netlist score;
impart a score of a predetermined value according to a magnitude relationship between the input and output values and the first threshold for each constituent net of the netlist to be verified,
obtain a score to be verified by totaling maximum scores of the scores imparted to the constituent nets for all aggregate nets of the netlist to be verified, and
perform hardware trojan detection in the netlist to be verified by evaluating the score to be verified based on the determination score threshold.

11. The hardware trojan detection device of claim 7, wherein the processor is further programmed to:
extract from among a plurality of known netlists a known netlist predicted to include a hardware trojan matching conditions of a count of clock cycles of outputting a constant value in a predetermined amount of time being a predetermined value or greater and a maximum score net count being at or below a maximum score net count threshold,
use the extracted known netlist to set the parameter and update the input and output, and
find a second threshold based on an output value obtained when a predetermined number of courses of the computation is performed;
wherein the hardware trojan detection is performed in the netlist to be verified using the second threshold.

12. The hardware trojan detection device of claim 7, wherein the hardware trojan detection is performed in the netlist to be verified based on a comparison between a circuit-scale-corresponding threshold, which corresponds to a circuit scale based on the netlist to be verified, and input and output values of any logic cell obtained when a predetermined number of courses of the computation is performed.

13. A non-transitory computer-readable medium storing instructions for configuring a computer to update input and output values of logic cells by performing computations according to logical expressions of all logic cells included in a netlist to be verified and to perform hardware trojan detection based on a comparison result between the updated input and output values and a threshold,
wherein:
the logic cells include a logic circuit and a buffer and a repeater other than the logic circuit; and
the instructions further configure the computer to, in each course of processing of updating the input values and the output values, when updating the buffer and the repeater, perform a predetermined number of updates until the input values are transmitted to an output of the buffer or the repeater.

14. The computer-readable medium of claim 13, wherein the instructions further configure the computer to:
set a parameter as an initial value for input and output nets of all logic cells,
update the input values and the output values by performing a predetermined number of courses of the computation using the set parameter for all logic cells, and
perform hardware trojan detection based on the output value of any logic cell obtained when the predetermined number of courses of the computation is performed.

15. The computer-readable medium of claim 13, wherein the instructions further configure the computer to:
use a known netlist including a hardware trojan and a known netlist including no hardware trojan to set the parameter and update the input and output,
find a first threshold based on input and output values in a constituent net obtained when a predetermined number of courses of the computation is performed, and
perform hardware trojan detection using the first threshold.

16. The computer-readable medium of claim 15, wherein the known netlists and the netlist to be verified are configured to include at least an aggregate net including one or more constituent nets configured by a group of circuits connected by interterminal nets; and
the instructions further configure the computer to:
acquire the first threshold for each constituent net;
impart a score of a predetermined value according to a magnitude relationship between the input and output values and the first threshold in each constituent net in the known netlists,
total maximum scores of the scores imparted to the constituent nets for all aggregate nets of the known netlists,
compare obtained netlist scores, and obtain a determination score threshold based on the smallest netlist score,
impart a score of a predetermined value according to a magnitude relationship between the input and output values and the first threshold for each constituent net of the netlist to be verified,
obtain a score to be verified by totaling maximum scores of the scores imparted to the constituent nets for all aggregate nets of the netlist to be verified, and
perform hardware trojan detection in the netlist to be verified by evaluating the score to be verified based on the determination score threshold.

17. The computer-readable medium of claim 13, wherein the instructions further configure the computer to:
extract from among a plurality of known netlists a known netlist predicted to include a hardware trojan matching conditions of a count of clock cycles of outputting a constant value in a predetermined amount of time being a predetermined value or greater and a maximum score net count being at or below a maximum score net count threshold,
use the extracted known netlist to set the parameter and update the input and output, find a second threshold based on an output value obtained when a predetermined number of courses of the computation is performed, and perform hardware trojan detection in the netlist to be verified using the second threshold.

18. The computer-readable medium of claim 13, wherein the instructions further configure the computer to perform hardware trojan detection in the netlist to be verified based on a comparison between a circuit-scale-corresponding threshold, which corresponds to a circuit scale based on the netlist to be verified, and input and output values of any logic cell obtained when a predetermined number of courses of the computation is performed.

* * * * *